United States Patent
Li et al.

(10) Patent No.: US 8,189,718 B2
(45) Date of Patent: May 29, 2012

(54) ADAPTIVE OPTIMIZATION METHOD AND APPARATUS FOR AVERAGE LENGTH

(75) Inventors: Lei Li, Beijing (CN); Zhenning Tao, Beijing (CN); Hisao Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 533 days.

(21) Appl. No.: 12/495,834

(22) Filed: Jul. 1, 2009

(65) Prior Publication Data

US 2010/0002810 A1 Jan. 7, 2010

(30) Foreign Application Priority Data

Jul. 1, 2008 (CN) .......................... 2008 1 0131855

(51) Int. Cl.
*H04L 27/00* (2006.01)
(52) U.S. Cl. ......... 375/324; 375/326; 375/354; 375/371
(58) Field of Classification Search ........... 375/142, 375/150, 325, 326, 327, 354, 355, 371, 373, 375/375; 370/503, 252
See application file for complete search history.

(56) References Cited

U.S. PATENT DOCUMENTS

| | | | | |
|---|---|---|---|---|
| 6,249,180 B1 * | 6/2001 | Maalej et al. | ................. | 329/304 |
| 7,548,587 B2 * | 6/2009 | Zhang | ........................... | 375/260 |
| 8,036,289 B2 * | 10/2011 | Ryoo et al. | .................... | 375/260 |
| 8,098,769 B2 * | 1/2012 | Steinbach | .................... | 375/326 |

OTHER PUBLICATIONS

Zhenning Tao et al., "Multiplier-free Phase Recovery for Optical Coherent Receivers", 2008 Optical Society of America, 3 pages.
Dany-Sebastien et al., "Coherent Detection of Optical Quadrature Phase-Shift Keying Signals With Carrier Phase Estimation", Journal of Lightwave Technology, vol. 24, No. 1, Jan. 2006, 10 pages.

* cited by examiner

*Primary Examiner* — Dac Ha
(74) *Attorney, Agent, or Firm* — Staas & Halsey LLP

(57) ABSTRACT

The invention provides an average length adaptive optimization method and apparatus. An adaptive optimization method for the average length used for phase recovery comprising: a residual phase difference calculation step, for receiving a current phase of a digital symbol obtained by phase recovery and a data modulation phase of the digital symbol obtained by data recovery, and calculating a residual phase difference of the digital symbol, which is a difference between the current phase and the data modulation phase of the digital symbol; a residual phase difference auto-correlation value calculation step, for calculating an auto-correlation value of the residual phase difference with displacement m, wherein $-10 \leq m \leq 10$, and m is an integral; an optimization step, for optimizing the average length based on the residual phase difference auto-correlation value.

13 Claims, 9 Drawing Sheets

ADAPTIVE OPTIMIZATION METHOD AND APPARATUS FOR AVERAGE LENGTH

TECHNICAL FIELD

The present invention relates to an optimization apparatus and method for phase recovery. The present invention includes an apparatus and method for adaptively optimizing the average length used in a phase recovery device which performs phase recovery via an average of carrier phases of a digital signal.

BACKGROUND ART

As the requirements for the capacity and flexibility of the communication system are gradually improved, the coherent communication technique becomes more and more important. In comparison with non-coherent technique (e.g., on-off key, OOK) or self-coherent technique (e.g., differential quadrature phase shift key, DQPK), the coherent technique has the following advantages: the signal to noise ratio (SNR) gain is 3 dB; transmission capacity can be improved by using a more effective modulation technique (e.g., quadrature modulation, QAM), and an Electronic Equalization technique can be conveniently used to deal with the channel change and reduce the cost, etc. Presently, the recovery of carrier phase in the coherent receiver is generally realized via the digital technique, such as a method based on the m-th power, proposed by D. Ly-Gagon, etc. in "Coherent detection of optical quadrature phase-shift keying signal with carrier phase estimation" (Journal of Lightwave Technology, Vol. 24, No. 1, January 2006, pp. 12-21), and a method based on data pre-decision, proposed by Z. Tao etc. in "Multiplier-free Phase Recovery for Optical Coherent Receiver" (OWT2, OFC2008). The common ground between digital phase recovery techniques is that: the carrier phase is assumed invariant at multiple data symbols, so as to eliminate the influence of channel noise on the phase estimation using an average of the carrier phases on the symbols. Such assumption apparatus that, in order to get an optimum phase recovery performance, the average length shall be an optimum compromise between the intensity of channel noise and the variation speed of carrier phase. Multiple tests have shown that an unmatched average length has a great influence on the performance of the coherent receiver.

However, in actual transmission system, the intensity of channel noise and the variation speed of carrier phase are dependent on many factors (e.g., characteristics of the laser and channel), but those factors are variable and difficult to be measured via real-time detection.

It can be seen that the average length in digital phase recovery shall be optimized, so that the coherent receiver can work in an optimum state. This technique must have the following characteristics:
1. Non-training: prior knowledge such as training sequence or channel/laser characteristics is not required;
2. Adaptability: optimization can be automatically realized with changes of the channel noise intensity and the variation speed of carrier phase;
3. Simple calculation: the calculation is of low complexity so as to be realized in high speed receiver.

In order to solve the above problems, the present invention provides a method and apparatus for automatically optimizing an average length used in a phase recovery device.

SUMMARY OF THE INVENTION

The problem to be solved in the invention is to adaptively optimize and adjust an average length used in a phase recovery device that eliminates the influence of channel noise via an average of carrier phases on digital symbols, make a compromise between the intensity of channel noise and the variation speed of carrier phase to obtain a matched average length, and perform a phase recovery with the matched average length.

A brief description of the present invention is given as follows, so as to provide basic understanding of certain aspects of the invention. To be noted, the description is not an exhaustive description. It intends neither to determine the key part or important part of the invention, nor to define the scope of the invention. The purpose is just to give some concepts of the invention in a simplified form, as a preface of detailed descriptions given subsequently. For a person skilled in the art, the following aspects of the invention and the solutions defined by the accompanied independent claims can be in any possible combination with the embodiments and/or dependent claims of the invention.

The first aspect of the invention provides an adaptive optimization method for an average length adopted in phase recovery, comprising: a residual phase difference calculation step, for receiving a current phase of a digital symbol obtained by phase recovery and a data modulation phase of the digital symbol obtained by data recovery, and calculating a residual phase difference of the digital symbol, which is a difference between the current phase and the data modulation phase of the digital symbol; a residual phase difference auto-correlation value calculation step, for calculating a auto-correlation value of the residual phase difference with displacement m, wherein $-10 \leq m \leq 10$, and m is an integral; an optimization step, for optimizing the average length based on the residual phase difference auto-correlation value.

Preferably, wherein the optimization step comprising: a positive and negative determination step, for determining whether the auto-correlation value of the residual phase difference is positive or negative; the average length used in phase recovery is decreased when the auto-correlation value of the residual phase difference is determined to be positive, and the average length used in phase recovery is increased when the auto-correlation value of the residual phase difference is determined to be negative.

Preferably, wherein before the positive and negative determination step, the optimization step further comprising: a threshold determination step, for determining whether the auto-correlation value of the residual phase difference is within a predetermined threshold range, and when the auto-correlation value of the residual phase difference is determined to be within the predetermined threshold range, optimization on the average length is not carried out; otherwise the positive and negative determination step is carried out.

Preferably, wherein before the residual phase difference calculation step, the optimization method further comprising: a down sampling step, for performing a down sampling on the received current phase and data modulation phase, and then performs the residual phase difference calculation step by using the current phase and the data modulation phase obtained by the down sampling.

Preferably, before the threshold determination step, the optimization method further comprising: a normalization processing step, for normalizing the auto-correlation value of the residual phase difference; the threshold determination step determines whether the normalized absolute value of the auto-correlation value of the residual phase difference is larger than a predetermined value being less than 1, and when the absolute value is less than the predetermined value, optimization of the average length is not carried out; otherwise the auto-correlation value of the residual phase difference is further determined by performing the positive and negative determination step.

Preferably, a normalization coefficient used in the normalization process is $$\frac{1}{R_{\Delta\varphi_k+\varphi_{n,k}}(0)-R_{\Delta\varphi_k+\varphi_{n,k}}(1)},$$

wherein $R_{\Delta\Phi_k+\Phi_{n,k}}(0)-R_{\Delta\Phi_k+\Phi_{n,k}}(1)$ apparatus a difference between auto-correlation values of the residual phase difference with displacement 0 and auto-correlation values of the residual phase difference with displacement 1.

The second aspect of the invention provides a apparatus for adaptive optimization of an average length adopted in a phase recovery device, comprising: a residual phase difference calculation unit, for receiving a current phase of a digital symbol obtained by phase recovery, and a data modulation phase of the digital symbol obtained by data recovery, and calculating a residual phase difference of the digital symbol, which is a difference between the current phase and the data modulation phase of the digital symbol; a residual phase difference auto-correlation value calculation unit, for calculating a auto-correlation value of the residual phase difference with displacement m, wherein $-10\leq m\leq 10$, and m is an integral; an optimization unit, for optimizing the average length based on the residual phase difference auto-correlation value.

Preferably, wherein the optimization unit comprising: a positive and negative determination unit, for determining whether the auto-correlation value of the residual phase difference is positive or negative; the positive and negative determination unit outputs an optimization signal indicative of decreasing the average length when it determines that the auto-correlation value of the residual phase difference is positive, and outputs an optimization signal indicative of increasing the average length when it determines that the auto-correlation value of the residual phase difference is negative.

Preferably, wherein before the positive and negative determination unit, the optimization unit further comprising: a threshold determination unit, for determining whether the auto-correlation value of the residual phase difference is within a predetermined threshold range, and when the threshold determination unit determines that the auto-correlation value of the residual phase difference is within the predetermined threshold range, optimization of the average length is not carried out; otherwise the auto-correlation value of the residual phase difference is determined by using the positive and negative determination unit.

Preferably, wherein before the residual phase difference calculation unit, the apparatus further comprising: a down sampling unit, for performing a down sampling on the received current phase and data modulation phase; and the residual phase difference calculation unit calculates the residual phase difference by using the current phase and the data modulation phase obtained by the down sampling.

Preferably, before the threshold determination unit, the apparatus further comprising: a normalization processing unit, for normalizing the auto-correlation value of the residual phase difference; the threshold determination unit determines whether the normalized absolute value of the auto-correlation value of the residual phase difference is larger than a predetermined value being less than 1; when the absolute value is less than the predetermined value, optimization of the average length is not carried out; otherwise the auto-correlation value of the residual phase difference is determined by using the positive and negative determination unit.

Preferably, wherein a normalization coefficient used in the normalization processing unit is $$\frac{1}{R_{\Delta\varphi_k+\varphi_{n,k}}(0)-R_{\Delta\varphi_k+\varphi_{n,k}}(1)},$$

wherein apparatus $R_{\Delta\Phi_k+\Phi_{n,k}}(0)-R_{\Delta\Phi_k+\Phi_{n,k}}(1)$ apparatus a difference between auto-correlation values of the residual phase difference with displacement 0 and auto-correlation values of the residual phase difference with displacement 1.

The third aspect of the invention provides a coherent receiver, characterized in that, comprising any of the above adaptive optimization apparatus for an average length.

The fourth aspect of the invention provides a computer program that enables the computer to perform the following steps: a residual phase difference calculation step, for receiving a current phase of a digital symbol obtained by phase recovery, and a data modulation phase of the digital symbol obtained by data recovery, and calculating a residual phase difference of the digital symbol, which is a difference between the current phase and the data modulation phase of the digital symbol; a residual phase difference auto-correlation value calculation step, for calculating a auto-correlation value of the residual phase difference with displacement m, wherein $-10\leq m\leq 10$, and m is an integral; a positive and negative determination step, for determining whether the auto-correlation value of the residual phase difference is positive or negative; an optimization step, for decreasing the average length used in phase recovery when the auto-correlation value of the residual phase difference is determined to be positive, and increasing the average length used in phase recovery when the auto-correlation value of the residual phase difference is determined to be negative.

The fifth aspect of the invention provides a storage medium, on which the computer program of the fourth aspect of the invention is stored.

The above optimization apparatus and method for the average length comprehensively consider the intensity of channel noise and the variation speed of carrier phase, so that prior knowledge such as training sequence or channel/laser characteristics is not required, and the adaptive optimization can be realized with changes of the intensity of channel noise and the variation speed of carrier phase. In addition, the apparatus and method have the characteristics of low calculation complexity and parallel implementations, which greatly reduce the difficulty of hardware implementation.

The method and apparatus can optimize the digital phase recovery device in the actual system to obtain an optimum receptivity, and can be used in all devices that eliminate the noise influence and recover the phase via an average of carrier phases of digital symbol, for example, a coherent receiver, and particularly an optical coherent receiver.

The embodiments of the invention are described detailedly in conjunction with the accompanied drawings.

BRIEF DESCRIPTION OF THE DRAWINGS

The embodiments are described in reference to the following drawings, and the following examples are just exemplary and do not limit the invention, in which.

DETAILED DESCRIPTION OF THE PREFERRED EMBODIMENTS

Figure 1:
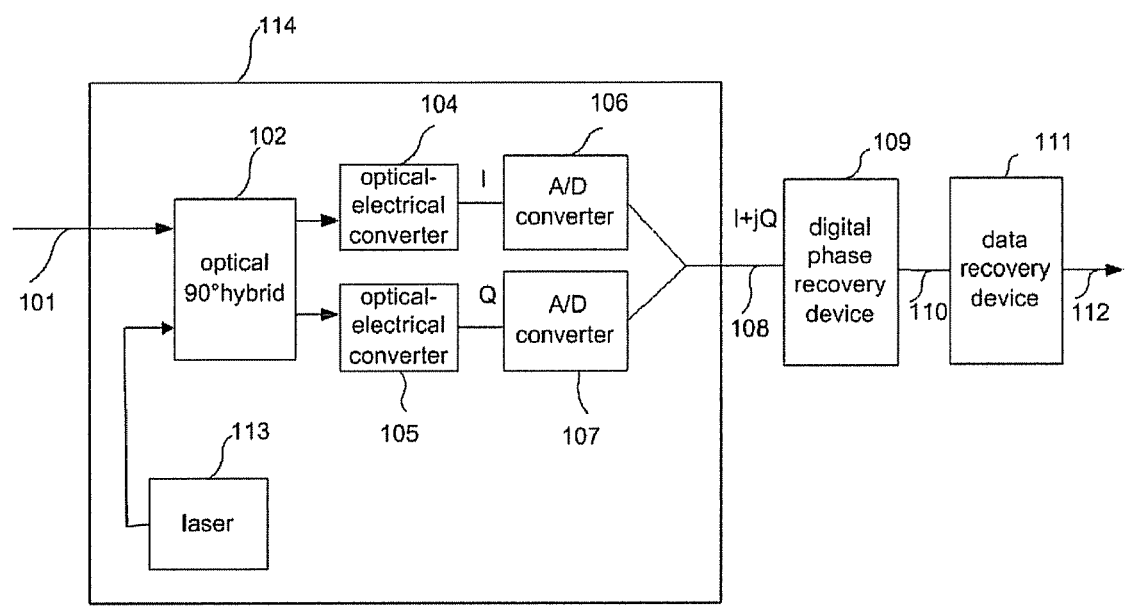
FIG. 1 shows a structure diagram of an existing receiver that uses a digital phase recovery device.

FIG. 1 shows a known optical coherent receiver utilizing a digital phase recovery device (herein the optical coherent receiver is taken as an example, certainly, the present invention is not limited to the optical coherent receiver; in the fact, any device performing noise influence elimination and phase recovery via average of carrier phase of digital symbol can use the average length optimization apparatus and method to be descried as follows). Wherein, the apparatus comprise a front end 114, a digital phase recovery device 109 and a data recovery device 111. The front end 114 comprises an optical 90° hybrid 102, optical/electrical converters 104, 105, analog/digital converters 106, 107, and a laser 113. The front end 114 converts a received optical signal 101 into a baseband electrical signal 108, which can be represented as I+jQ=exp(j$\phi_d$+j$\phi_0$). Under common conditions, an argument of the baseband electrical signal 108 contains not only data information $\phi_d$, but also a phase shift $\phi_0$ between the carrier and local oscillator.

The digital phase recovery device 109 receives the baseband signal 108 recovered by the front end 114, eliminates the phase shift $\phi_0$ in the baseband signal 108, and outputs the data information $\phi_d$ to the data recovery device 111, the data recovery device 111 recovers transmitted data 112 based on the phase of the received symbol of which the phase shift has been eliminated.

Figure 2:
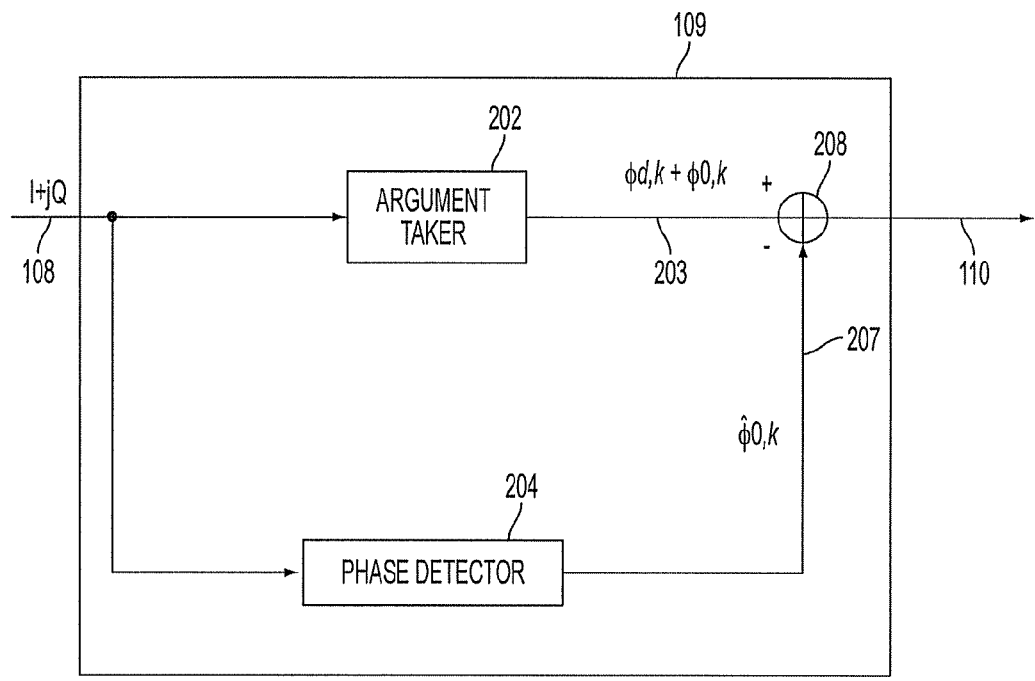
FIG. 2 shows a structure diagram of an existing digital phase recovery device.

It can be seen that the digital phase recovery device 111 is a very important part in the coherent receiver. The structure of the known digital phase recovery device 109 is illustrated in FIG. 2. A phase detector 204 detects a phase shift $\hat{\phi}_{0,k}$ on each data symbol, based on the inputted baseband signal 108, $\hat{\phi}_{0,k}$ is an estimation of the phase shift $\phi_0$ between the carrier of the k-th digital symbol and local oscillator. Interference factors, such as noises, exist in the channel and receiver, and during the estimation of $\hat{\phi}_{0,k}$, influences of those factors shall be eliminated. Under common conditions, the variation of the phase shift between the carrier and local vibrator is slower than the noise variation, thus usually interferences of the noises, etc. can be eliminated by calculating an average value of the carrier phases of digital symbols, so as to obtain an accurate $\hat{\phi}_{0,k}$. After obtaining $\hat{\phi}_{0,k}$ a phase recovery is realized by subtracting $\hat{\phi}_{0,k}$ from a phase of the digital signal outputted from an argument taker 202. It can be seen that averaging the carrier phases of digital symbol is an essential part for the above phase recovery.

In general, the above averaging can be realized through arithmetic averages in segments, or sliding average. However, no matter how the average is realized, if the average length is chosen too long, an output 207 of the phase detector 204 will not truly reflect the phase shift of the current digital symbol, since the phase shift has changed obviously during the averaging process. On the other hand, if the average length is chosen too short, influence of noise on the estimation of phase shift will not be completely eliminated, and the output 207 of the phase detector 204 will not truly reflect the phase shift too. Thus in order to make the output 207 of the phase detector 204 truly reflect the phase shift of the current digital symbol, the selected average length must be an optimum compromise between the noise intensity and the variation speed of phase shift. To be noted at the same time, in the actual system, the variation speed of phase shift and the noise intensity are not fixed, but vary with the changing of channel conditions.

In details, a phase of the k-th digital symbol obtained by phase recovery can be represented as $\phi_{d,k}+\phi_{0,k}+\phi_{n,k}-\hat{\phi}_{0,k}$, wherein $\phi_{d,k}$ denotes the data modulation phase of the k-th symbol, $\phi_{0,k}$ denotes the phase shift between the carrier and local vibrator on the k-th symbol, $\phi_{n,k}$ denotes the noise influence on the phase of the k-th symbol, and $\hat{\phi}_{0,k}$ denotes the estimation value of $\phi_{0,k}$ by the phase recovery device, the data recovery device 111 judges the phase estimation value $\hat{\phi}_{0,k}$ to obtain the estimation value $\hat{\phi}_{d,k}$ of the data modulation phase of the k-th symbol. Statistically, it can be deemed that $\hat{\phi}_{d,k}=\phi_{d,k}$, herein a difference between a current phase 110 of the digital symbol, which is obtained through a phase recovery by the digital phase recovery device, and a data modulation phase 112, which is obtained through a data recovery by the data recovery device, is defined as residual phase difference, thus the residual phase difference of the k-th digital symbol can be represented as:

$$(\phi_{d,k}+\phi_{0,k}+\phi_{n,k}-\hat{\phi}_{0,k})-\phi_{d,k}=\phi_{0,k}-\hat{\phi}_{0,k}+\phi_{n,k},$$

Wherein $\phi_{0,k}-\hat{\phi}_{0,k}$ is the phase recovery error, which is represented as $\Delta\phi_k$ hereinafter, and for an ideal phase recovery, $\Delta\phi_k$ shall be 0; under the precondition that $\Delta\phi_k=0$, according to the definition of auto-correlation, the auto-correlation value of the residual phase difference with displacement being zero is expressed in formula (1):

$$R_{\Delta\phi_k+\phi_{n,k}}(0)=E\{(\Delta\phi_k+\phi_{n,k})^2\}=E\{\phi_{n,k}^2\} \quad (1),$$

According to the statistical characteristics of the residual phase difference, it can be determined that formula (2) will be satisfied no matter what the selected average length is:

$$E\{\phi_{n,k}^2\}=R_{\Delta\phi_k+\phi_{n,k}}(0)-R_{\Delta\phi_k+\phi_{n,k}}(1) \quad (2)$$

Wherein $R_{\Delta\phi_k+\phi_{n,k}}(1)$ is the auto-correlation of the residual phase difference with displacement being 1, and is represented as follows:

$$R_{\Delta\phi_k+\phi_{n,k}}(1)=E\{(\Delta\phi_k+\phi_{n,k})(\Delta\phi_{k-1}+\phi_{n,k+1})\}.$$

Based on formulas (1) and (2), it can be determined that when $R_{\Delta\phi_k+\phi_{n,k}}(1)=0$, the formula $R_{\Delta\phi_k+\phi_{n,k}}(0)=E\{\phi_{n,k}^2\}$ is satisfied, i.e., make $\Delta\phi_k=0$, so as to obtain an ideal phase recovery performance.

Figure 3:
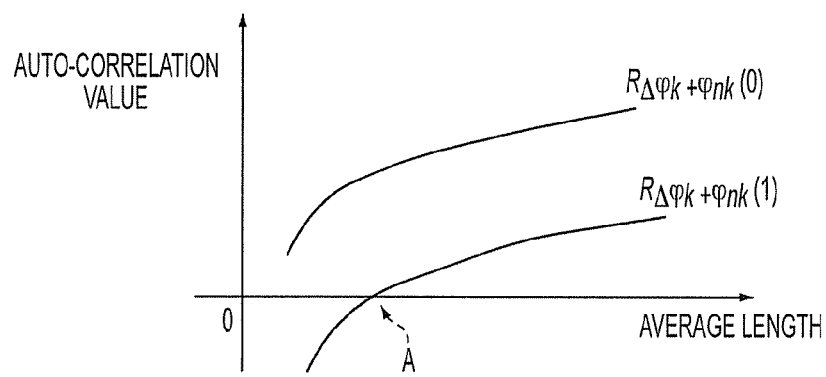
FIG. 3 is a schematic diagram showing the logical relations between auto-correlation values $R_{\Delta\phi_k+\phi_{n,k}}(0)$, $R_{\Delta\phi_k+\phi_{n,k}}(1)$ of residual phase difference and an average length.

On the other hand, according to the mathematical statistical model of phase recovery device, it can be determined that the auto-correlation value of the residual phase difference and an average length selected for phase recovery performed by the phase recovery device have a relation as shown in FIG. 3, i.e., $R_{\Delta\phi_k+\phi_{n,k}}(1)$ monotonically increases with the average length selected in the phase recovery device. As mentioned above, when $R_{\Delta\phi_k+\phi_{n,k}}(1)=0$, the phase recovery performance is optimized, thus as shown in FIG. 3, when an auto-correlation value $R_{\Delta\phi_k+\phi_{n,k}}(1)$ of a residual phase difference between two adjacent digital symbols satisfies $R_{\Delta\phi_k+\phi_{n,k}}(1)=0$, the length corresponding to an intersection point A at which the curve $R_{\Delta\phi_k+\phi_{n,k}}(1)$ intersects the abscissa axis is the optimum average length. In addition, FIG. 3 shows the adjustment direction of the average length for optimizing the phase recovery performance, i.e., when $R_{\Delta\phi_k+\phi_{n,k}}(1)<0$, it apparatus the average length is relatively small, thus the average length should be increased, while when $R_{\Delta\phi_k+\phi_{n,k}}(1)>0$, it apparatus the average length is relatively large, then the average length should be decreased. In summary, the average length shall be adjusted in a direction that makes the value of $R_{\Delta\phi_k+\phi_{n,k}}(1)$ be 0.

To be noted, as mentioned above, formula (2) is obtained based on the statistical characteristics of the residual phase difference, this is under the precondition that $\Delta\phi_k=\Delta\phi_{k+1}$, i.e., phase recovery errors of two adjacent digital symbols are assumed to be equal, of course, for a person skilled in the art, such assumption is not limited to two adjacent digital symbols, and phase recovery errors of three or more adjacent digital symbols can also be assumed to be equal, i.e., $\Delta\phi_k=\Delta\phi_{k+m}$, and accordingly, $R_{\Delta\phi_k+\phi_{n,k}}(m)=0$ ($m=1, 2, 3 \ldots$, wherein m is an integer), naturally, m cannot be infinite, because if m is too large, the above assumption is not tenable, and the corresponding conclusion is also incorrect. Thus the value of m shall be properly selected according to actual conditions, and preferably, $-10 \leq m \leq 10$, wherein m is an integer.

In view of the above reasons, the invention detects the phase recovery performance by calculating the auto-correlation value of the residual phase difference of the digital symbol obtained by phase recovery, and adaptively optimizes the average length selected for phase recovery performed by the phase recovery device, based on the detection result.

EXAMPLE 1

Figure 4:
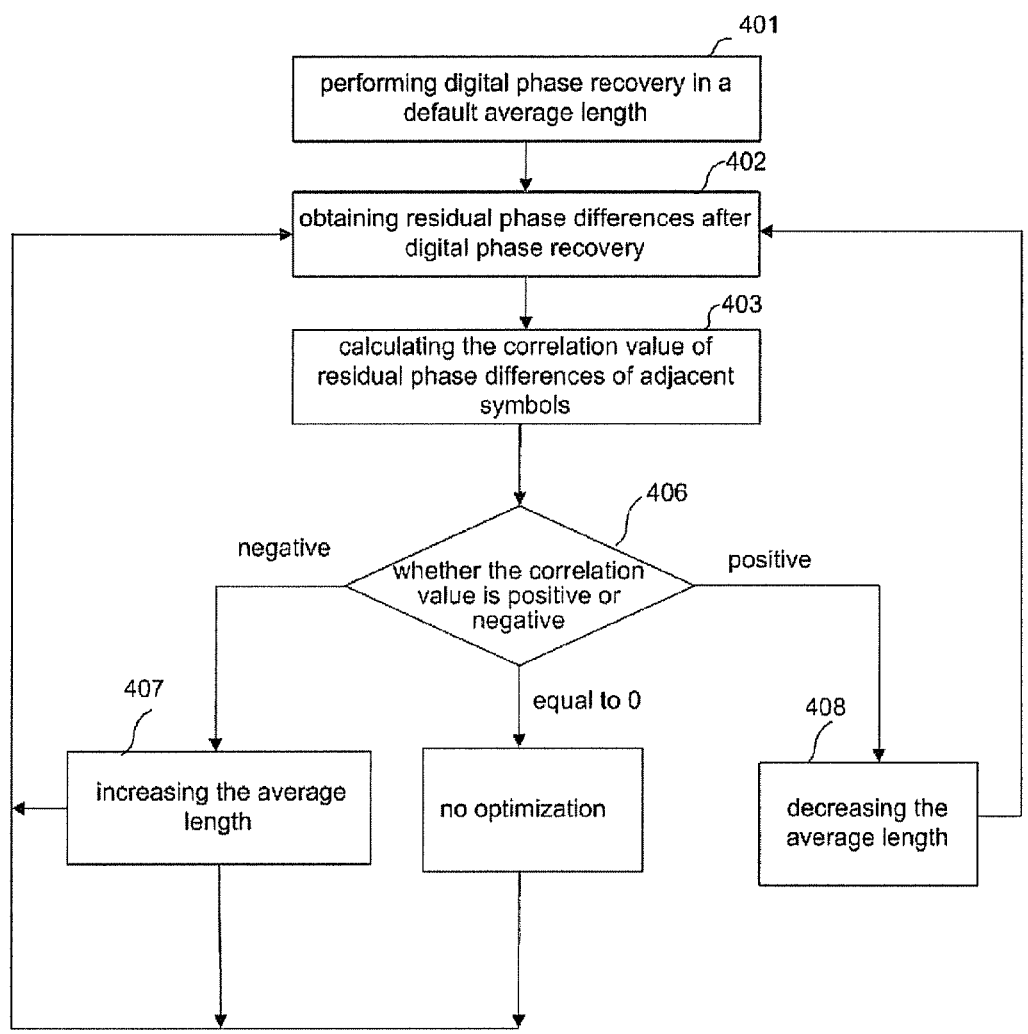
FIG. 4 shows a phase recovery flow that adopts an average length adaptive optimization method of the first embodiment of the invention.

FIG. 4 shows a phase recovery method that adopts an average length adaptive optimization flow of the first embodiment of the invention. When the receiver is started or the received channel is changed, the phase recovery device firstly works with a default average length, which may be a reasonable value selected according to different application occasions (step 401); then calculates a difference between the current phase of the symbol, which is obtained from the output of the phase recovery device, and a data modulation phase of the symbol, which is obtained from the output of the data recovery device, i.e., a residual phase difference (step 402); next, calculates an auto-correlation value of the residual phase difference of the digital symbol with the displacement being m (m may be chosen to be 1, 2, 3, . . . , and preferably $-10 \leq m \leq 10$) obtained in step 402, i.e., a correlation value of the residual phase difference of the m-th symbol adjacent to the current digital symbol (step 403); then in step 406, judges whether the correlation value is positive or negative, when the correlation value is positive, it apparatus the selected average length is relatively large, then enters step 408 to reduce the average length and then returns to step 402; when the correlation value is negative, it apparatus the selected average length is relatively small, enters step 407 to increase the average length, and then returns to step 402; when the correlation value is 0, it apparatus the current average length is optimum and does not need adjustment or optimization, so returns to step 402 without optimization.

Figure 6:
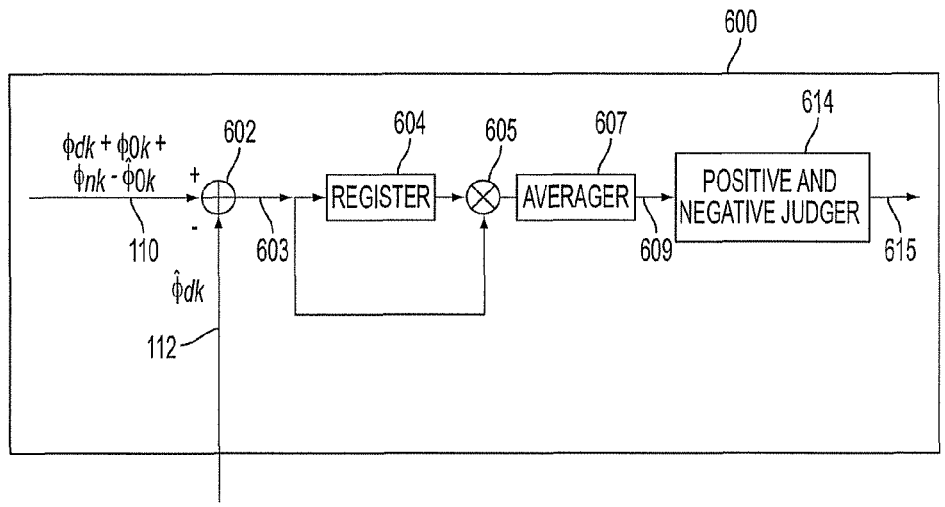
FIG. 6 shows an average length adaptive optimization apparatus of the first embodiment of the invention.

FIG. 6 shows an average length adaptive optimization apparatus of the first embodiment of the invention, which corresponds to the above average length adaptive optimization method. The optimization apparatus has two inputs, one is the symbol phase 110 $\phi_{d,k}+\phi_{O,k}+\phi_{n,k}-\hat{\phi}_{O,k}$ from the phase recovery device, obtained by phase recovery, the other is the data modulation phase 112 $\hat{\phi}_{d,k}$ (i.e., the judge phase, e.g., in QPK modulation, 112 is one of $\pi/4$, $3\pi/4$, $5\pi/4$ and $7\pi/4$) from data recovery device, obtained by data recovery.

A residual phase difference 603 is obtained by subtracting the data modulation phase 112 from the symbol phase 110 via a subtracter 602. The residual phase difference 603 is outputted to a register ($Z^{-1}$) 604 and a multiplier 605 respectively, and is multiplied by a residual phase difference of the previous one symbol in the register 604, then the output is provided to an averager 607, and an output 609 of the averager 607 is auto-correlation value of residual phase difference with the displacement being 1. Of course, the auto-correlation value of residual phase difference is not limited to be multiplied by a residual phase difference of the previous one symbol, it may also be multiplied by residual phase differences of the previous two ore three symbols, accordingly, the register is not limited to one bit, and may be represented as register ($Z^{-m}$).

A positive negative judger 614 judges whether or not the residual phase difference auto-correlation value 609 outputted from the averager 607 is larger than 0, and outputs an optimization signal 615 based on the judge result. The optimization signal 615 instructs the adjustment direction of the average length in the phase recovery device. In details, when the residual phase difference auto-correlation value 609 is less than 0, it apparatus the data average length selected for phase recovery is relatively small, then the optimization signal 615 instructs to increase the average length; while when the residual phase difference auto-correlation value 609 is more than 0, it apparatus the data average length selected for phase recovery is relatively large, then the optimization signal 615 instructs to decrease the average length; when the residual phase difference auto-correlation value 609 is equal to 0, it apparatus the current average length is optimum, then no adjustment or optimization is needed.

EXAMPLE 2

Figure 5:
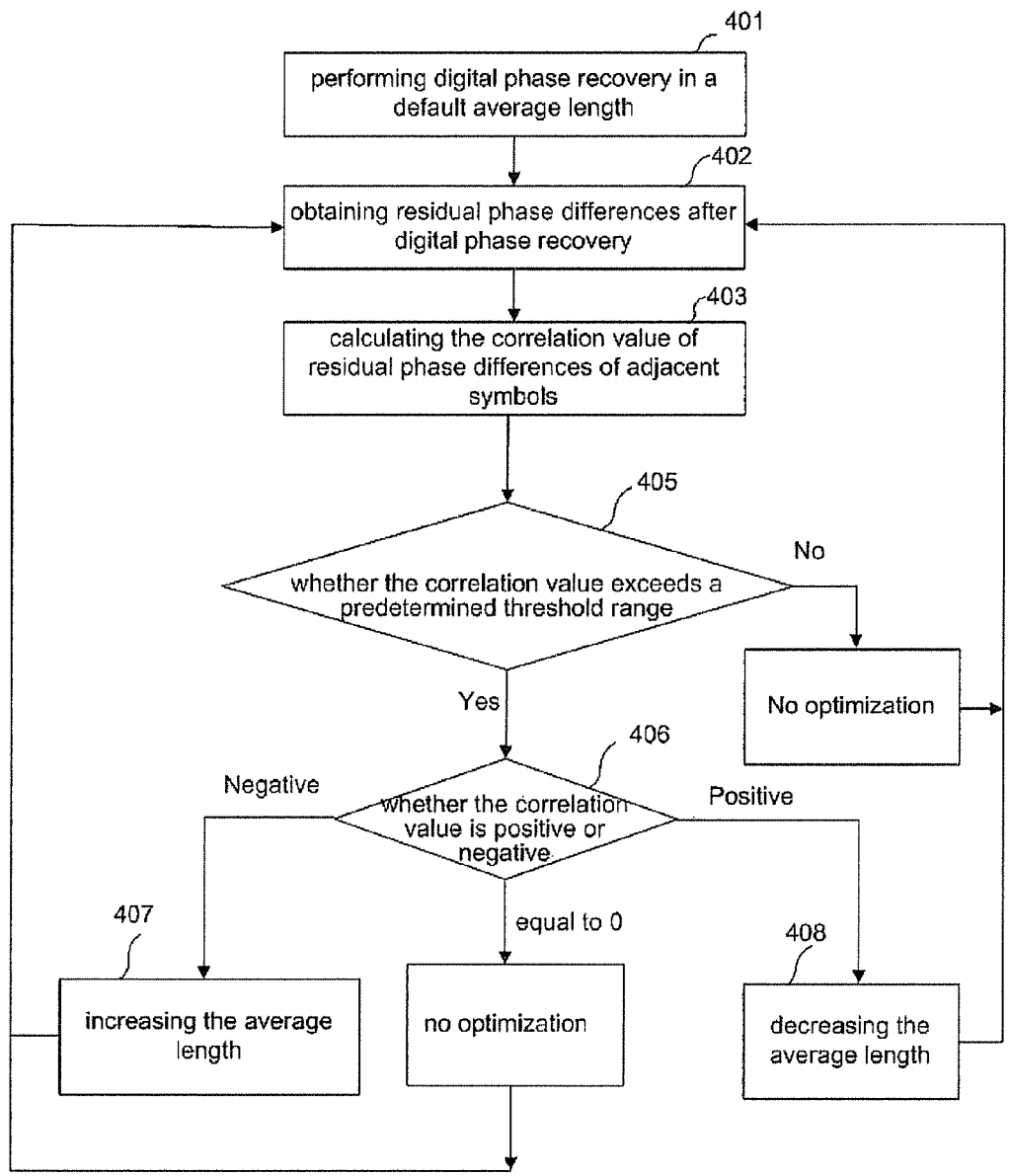
FIG. 5 shows an average length optimization flow of the second embodiment of the invention.

FIG. 5 shows a phase recovery method that adopts an average length adaptive optimization flow of the second embodiment of the invention.

It differs from the first embodiment only in follows: after calculating the auto-correlation value of the residual phase difference, judging in step 405 whether the auto-correlation value of the residual phase difference obtained in step 403 exceeds a predetermined threshold range having a midpoint of 0, such as (−5, +5), of course, the threshold range can be correspondingly selected according to different system characteristics. If the threshold range is not exceeded, an optimization will not be carried out, and the flow returns to step 402; and if the threshold range is exceeded, the auto-correlation value of the residual phase difference obtained in step 403 will be sent to step 406 for a further judge.

Figure 7:
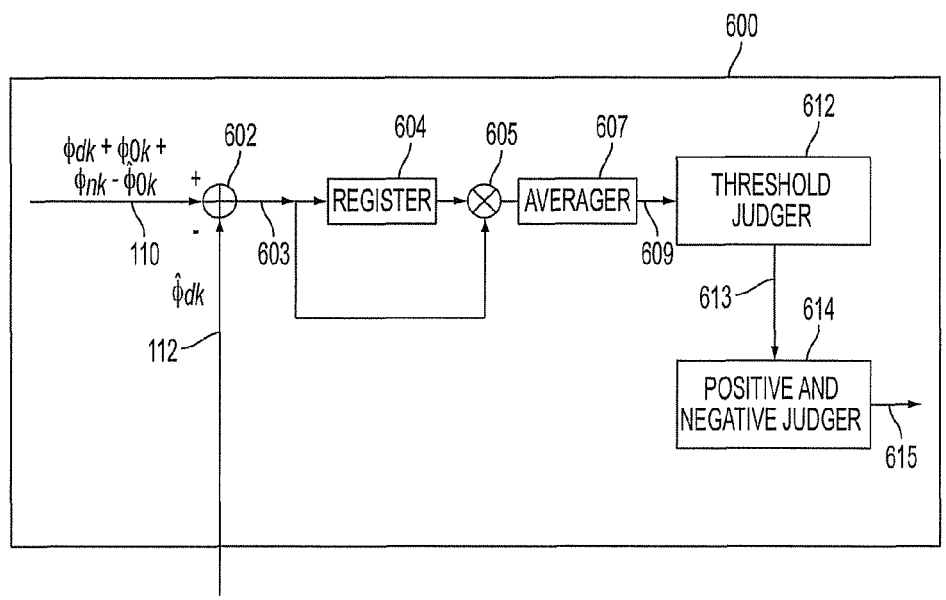
FIG. 7 shows an average length adaptive optimization apparatus of the second embodiment of the invention.

FIG. 7 shows an average length adaptive optimization apparatus of the second embodiment of the invention, corresponding to this average length optimization method. It differs from the optimization apparatus of the first embodiment as follows: before judging with the positive negative judger 614, firstly judging with a threshold judger 612, the residual phase difference auto-correlation value 609 firstly enters the threshold judger 612 which judges whether the absolute value of the residual phase difference auto-correlation value 609 is larger than a predetermined threshold, and if the absolute value is larger than the threshold, the threshold judger 612 will output the residual phase difference auto-correlation value 609 to the positive negative judger 614 for a positive negative judgment, otherwise, the optimization signal will not be outputted and the optimization will not be carried out. As mentioned above, the positive negative judger 614 outputs the optimization signal 615 by judging whether or not the residual phase difference auto-correlation value 609 is larger than 0, and the optimization signal 615 instructs the adjustment direction of the average length adopted in the phase recovery apparatus. In details, when the residual phase difference auto-correlation value 609 is less than 0, it apparatus the data average length selected for phase recovery is relatively small, and the optimization signal 615 instructs to increase the average length; while when the residual phase difference auto-correlation value 609 is larger than 0, it apparatus the data average length selected for phase recovery is relatively large, and the optimization signal 615 instructs to decrease the average length; when the residual phase difference auto-correlation value 609 is equal to 0, it apparatus the current average length is optimum, and no adjustment or optimization is needed.

In this preferred embodiment, with the threshold judger adopted, the frequency for optimizing can be controlled. For example, it is selectable to not perform an optimization when the absolute value of the residual phase difference auto-correlation value is less than 10 (the selection of the value varies with different systems, and an appropriate threshold can be selected according to the system's requirement on accuracy of the phase recovery). This enables not to perform an optimization when the residual phase difference auto-correlation value is within an allowed range (this condition apparatus that the difference between the current adopted average length and optimum average length is not large), so as to avoid too frequent optimizations, thus a compromise is made between the optimizing frequency and optimizing effect, at the same time, the required phase recovery accuracy is satisfied. Therefore the optimization efficiency is increased, and a high optimization frequency is avoided, thus the system stability is improved.

EXAMPLE 3

Figure 8:
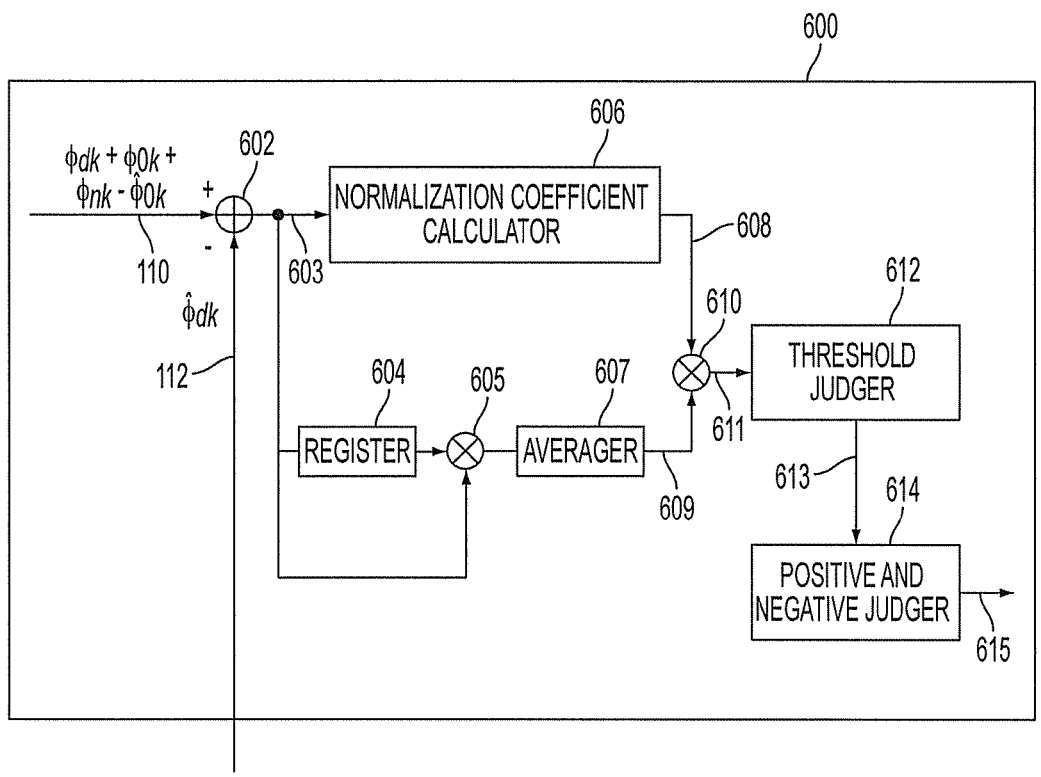
FIG. 8 shows an average length adaptive optimization apparatus of the third embodiment of the invention.

FIG. 8 shows an average length adaptive optimization apparatus of a third embodiment of the invention. It differs from the optimization apparatus of the second embodiment as follows: normalization is carried out on the residual phase difference auto-correlation value before the residual phase difference auto-correlation value is judged by the threshold judger 612. Wherein the residual phase difference 603 is provided in three routes, the first route enters into a normalization coefficient calculator 606, which calculates a normalization coefficient for normalizing the residual phase difference auto-correlation value; the second and third routes, same as the above embodiment, enters into the register 604 and the multiplier 605 respectively, and 607 outputs the auto-correlation value 609 of the residual phase difference with the displacement being 1 (m). The residual phase difference auto-correlation value 609 is multiplied by the output 608 of the normalization coefficient calculator 606 via a multiplier 610 to generate a normalized residual phase difference auto-correlation value 611. Then the normalized residual phase difference auto-correlation value 611 is inputted to the threshold judger 612 to perform threshold judging and optimization signal outputting. This process is same as that in the second embodiment, and herein is not described unnecessarily.

Figure 9A:
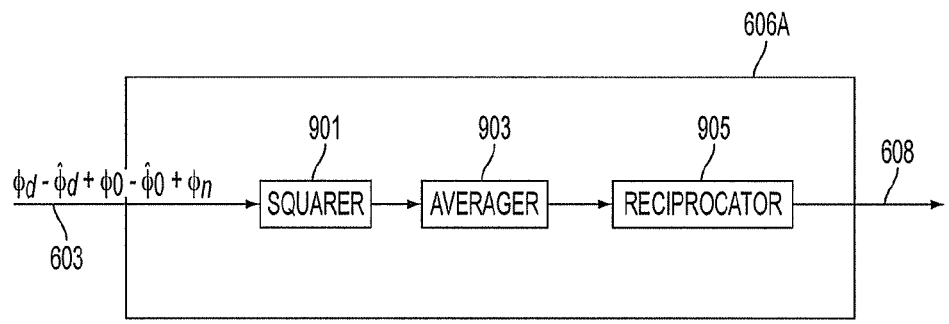
FIG. 9 shows two types of normalization coefficient calculators 9A and 9B that can be used in the average length adaptive optimization apparatus of the invention.
Figure 9B:
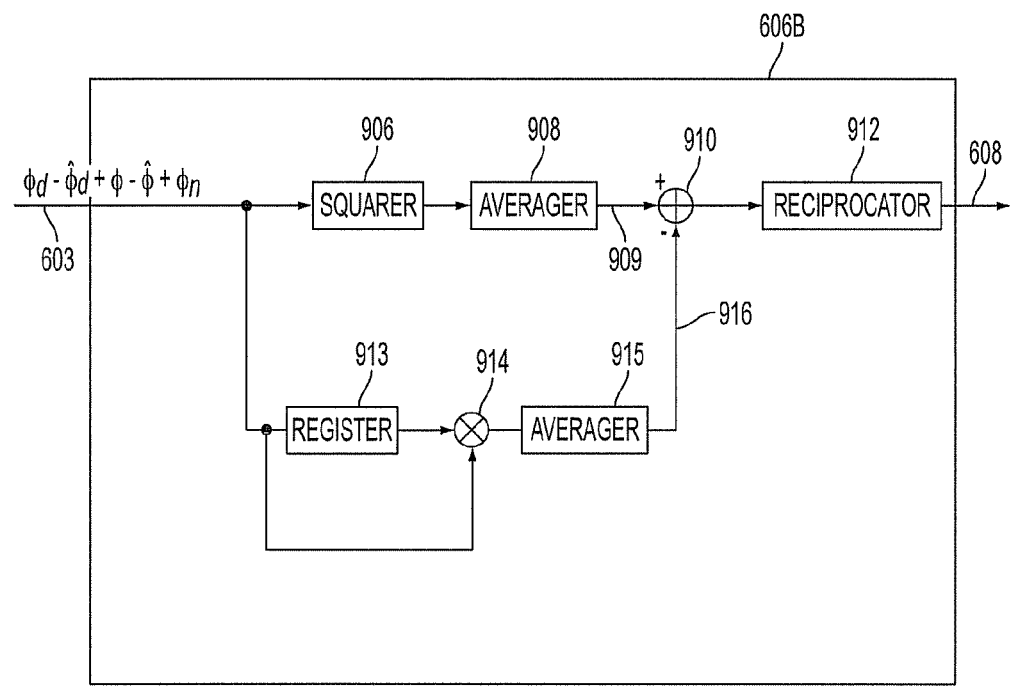

Here, as a most simply implementation, the normalization coefficient calculator 606 may output a constant, which may be a reciprocal (1/Rmax) of the maximum amplitude of the digital signal currently received by the system, therefore the constant varies with the system. In addition, the normalization coefficient calculator 606 may be a normalization coefficient calculator 606A or a normalization coefficient calculator 606B as shown in FIGS. 9A and 9B. Using the normalization coefficient to normalize the residual phase difference auto-correlation value 609, so that the normalized residual phase difference auto-correlation value 611 become a number having an absolute value less than 1, thus the threshold judger 612 can judge more conveniently. At that time, the threshold of the threshold judger can be chosen to be any value between 0 and 1, wherein when the threshold is 0, it apparatus an optimization will be carried out once the absolute value of the normalized residual phase difference auto-correlation value 611 is more than 0; and when the threshold is 1, it apparatus the optimization will not be carried out unless the absolute value of the normalized residual phase difference auto-correlation value 611 is larger than 1. However, as the absolute value of the normalized residual phase difference auto-correlation value 611 is always less than 1, therefore when the threshold is 1, it actually apparatus optimization will never be carried out.

In this embodiment, the normalization coefficient calculator is adopted to normalize the residual phase difference auto-correlation value 611, and limit the absolute value thereof to be less than 1, so that the subsequent judgment is more convenient.

FIGS. 9A-9B respectively illustrates two structures 606A and 606B of the normalization coefficient calculator 606. The input of the normalization coefficient calculator 606 is a symbol phase from which a phase shift $\hat{\phi}_0$ estimated by the phase recovery device and a data modulation phase $\hat{\phi}_d$ estimated by the data recovery device have been removed, i.e., the residual phase difference $\phi_{0,k} - \hat{\phi}_{0,k} + \phi_{n,k}$ of the present invention.

In FIG. 9A, the residual phase difference 603 ($\phi_{0,k} - \hat{\phi}_{0,k} + \phi_{n,k}$) is inputted to a squarer 901, which outputs a square $(\phi_{0,k} - \hat{\phi}_{0,k} + \phi_{n,k})^2$ of the residual phase difference 603, and then an averager 903 calculates an average value $E\{(\phi_{0,k} - \hat{\phi}_{0,k} + \phi_{n,k})^2\}$ of the quadratic sum of residual phase differences of plural symbols. Finally, a reciprocator 905 acquires a reciprocal $$\frac{1}{E\{(\Delta \varphi_k + \varphi_{n,k})^2\}}$$

of the average value of the quadratic sum of the counted symbols, i.e., $$\frac{1}{R_{\Delta \varphi_k + \varphi_{n,k}}(0)}.$$

This reciprocal is the normalization coefficient 608, the multiplier 610 multiplies the residual phase difference auto-correlation value 609 by the normalization coefficient 608 to obtain the normalized residual phase difference auto-correlation value 611.

In FIG. 9B, the outputted residual phase differences are provided into two routes, one is inputted to a squarer 906 and an averager 908 to obtain the average value $E\{(\phi_{0,k}-\hat{\phi}_{0,k}+\phi_{n,k})^2\}$ of the quadratic sum of the counted residual phase differences, and the other route goes along a register 913, a multiplier 914 and an averager 915. Like 604, 605 and 607 in FIG. 6, the register 913, multiplier 914 and averager 915 together perform the auto-correlation of the counted residual phase differences with displacement 1 (m, as mentioned previously, m is not limited to be 1, and may be an integer selected according to different systems, and preferably, $-10 \leq m \leq 10$). A subtraction is made between outputs 909 and 916 of the two routes in a subtracter 912, and then a reciprocal is made by a reciprocator 912 to obtain the normalization coefficient 608:

$$\frac{1}{E\{(\Delta\varphi_k + \varphi_{n,k})^2\} - E\{(\Delta\varphi_k + \varphi_{n,k})(\Delta\varphi_{k+1} + \varphi_{n,k+1})\}}, \text{ i.e., } \frac{1}{R_{\Delta\varphi_k+\varphi_{n,k}}(0) - R_{\Delta\varphi_k+\varphi_{n,k}}(1)}.$$

FIG. 9A differs from FIG. 9B only in that the normalization coefficient calculator in FIG. 9A shall operate every time after an average length adjustment (i.e., step 407 or 408 in FIG. 4) is performed for the phase recovery device, while as $R_{\Delta\phi_k+\phi_{n,k}}(0) - R_{\Delta\phi_k+\phi_{n,k}}(1)$ is a constant, the normalization coefficient calculator in FIG. 9B only needs to operate once time during the entire optimization process, and does not vary with the average length adjustment. Thus using the normalization coefficient calculator in FIG. 9B can further improve the optimization efficiency of the system.

EXAMPLE 4

Figure 10:
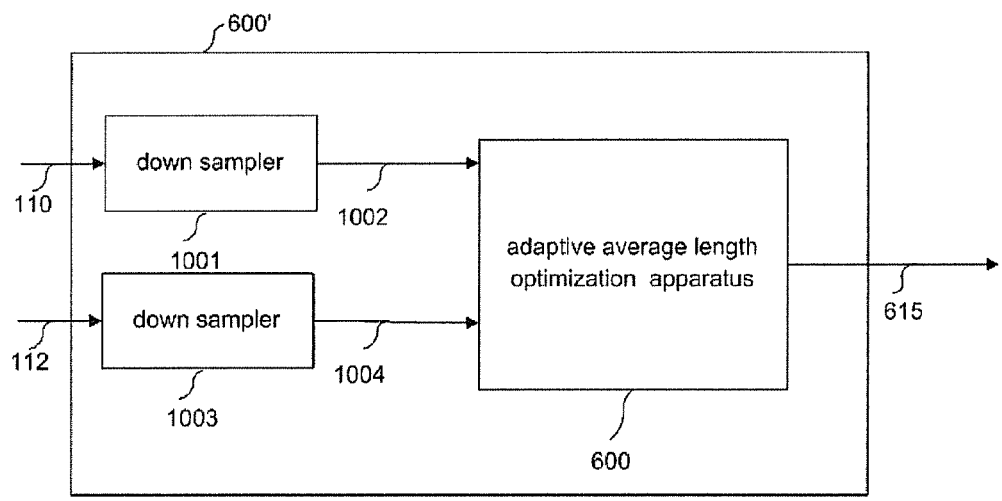
FIG. 10 shows a low speed implementation of the average length adaptive optimization apparatus of the invention.
Figure 11:
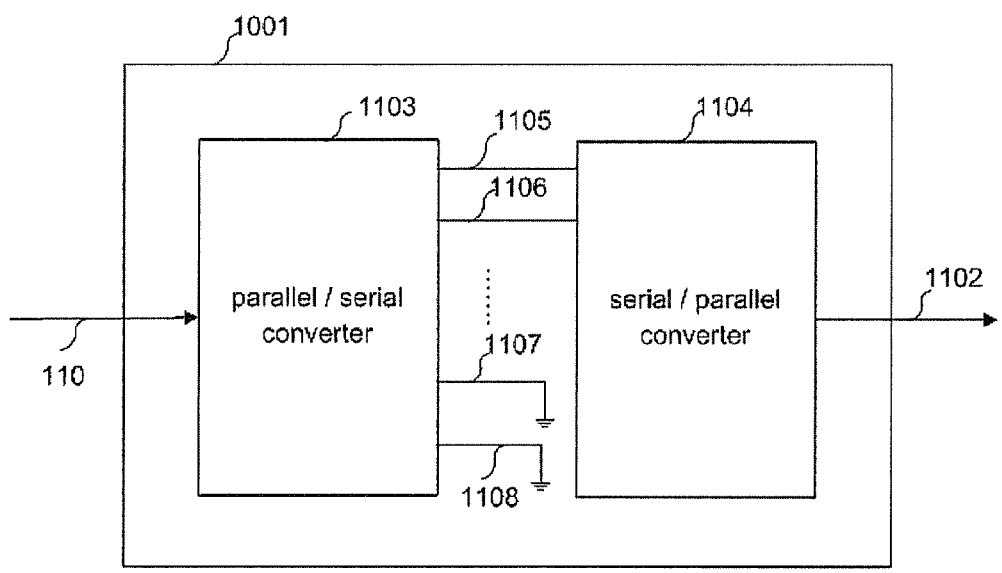
FIG. 11 shows an implementation of a down sampler adaptable to the invention.

FIG. 10 shows an average length adaptive low speed optimization apparatus 600' according to the fourth embodiment of the invention, wherein the low speed optimization apparatus is composed of any optimization apparatus 600 shown in FIGS. 6-8 and two down samplers 1001 and 1003.

The input of the adaptive average length optimization apparatus 600' is the output 110 of the phase recovery device and the output 112 of the data recovery device. The output of adaptive average length optimization apparatus 600 is an optimization signal that optimizes the average length used in the phase recovery device. Based on the optimization signal, the digital phase recovery device 109 increases or decreases the average length of the digital signal used for phase recovery in the phase recovery process.

The down samplers 1001 and 1003 respectively down samples high speed digital signals outputted from the phase recovery device and the data recovery device, so that the rate of input 1002, 1004 of the adaptive average length optimization apparatus 600 be far less than the output rate (i.e., symbol rate) 110, 112 of the phase recovery device and the data recovery device, thus the adaptive average length optimization apparatus 600 can operate at a speed far less than the symbol rate, and the requirement on hardware processing speed can be lowered greatly.

Figure 12:
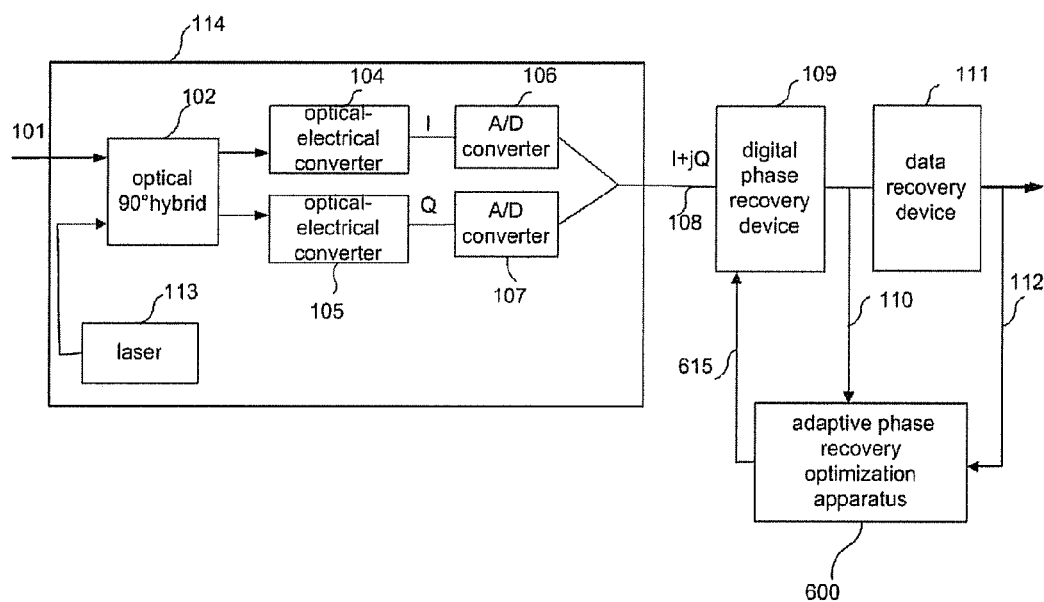
FIG. 12 shows a diagram of a coherent receiver that performs a phase recovery by using the average length adaptive optimization apparatus of the invention.

FIG. 12 shows a diagram of a coherent receiver using the adaptive average length optimization apparatus 600 (600') of the invention. The adaptive average length optimization apparatus 600 can be implemented in any method as shown in FIGS. 6-8 and 10.

The average length optimization apparatus and method of the invention can be used in any system that performs a phase recovery by utilizing a carrier phase average of digital signal, and particularly, in an optical coherent receiver.

For a person skilled in the art, the above methods are not limited to hardware implementations, and can be obviously implemented via computer program individually, or software and hardware combination method. The operation processes according to the above methods of the invention can also be implemented in form of computer-executable programs stored in various machine-readable storage mediums.

In addition, the object of the invention can also be realized as follows: directly or indirectly providing the storage medium storing the above executable program codes to the system or equipment, and reading and executing the program codes with a computer or CPU in the system or equipment.

At that time, if the system or equipment can execute a program, the embodiments of the invention will not be limited to the program, and the program can be in any form, such as object program, interpreter executed program, or script program provided to the operating system.

The above machine-readable storage mediums include, but not limited, various memories and memory cells, semiconductor devices, disc units and other mediums suitable for information storage.

In addition, the client computer can also implement the invention by connecting to corresponding website in the Internet, loading computer program codes of the invention and installing to the computer, and then executing the program.

Although the embodiments of the invention are described detailedly in conjunction with the drawings, it should be appreciated that, the above embodiments are only used to describe the invention, and are not limitations to the invention. A person skilled in the art can change and modify the above embodiments without deviating from the substance and scope of the invention. Therefore, the scope of the invention is only defined by the accompanied claims and their equivalents.

The invention claimed is:

1. An adaptive optimization method for an average length adopted in phase recovery, comprising:
    a residual phase difference calculation step, for receiving a current phase of a digital symbol obtained by phase recovery and a data modulation phase of the digital symbol obtained by data recovery, and calculating a residual phase difference of the digital symbol, which is a difference between the current phase and the data modulation phase of the digital symbol;
    a residual phase difference auto-correlation value calculation step, for calculating a auto-correlation value of the residual phase difference with displacement m, wherein $-10 \leq m \leq 10$, and m is an integral;
    an optimization step, for optimizing the average length based on the residual phase difference auto-correlation value.

2. The optimization method according to claim 1, wherein the optimization step further comprising:
    a positive and negative determination step, for determining whether the auto-correlation value of the residual phase difference is positive or negative;
    the average length used in phase recovery is decreased when the auto-correlation value of the residual phase difference is determined to be positive, and the average length used in phase recovery is increased when the auto-correlation value of the residual phase difference is determined to be negative.

3. The optimization method according to claim 2, wherein before the positive and negative determination step, the optimization step further comprising:
   a threshold determination step, for determining whether the auto-correlation value of the residual phase difference is within a predetermined threshold range, and when the auto-correlation value of the residual phase difference is determined to be within the predetermined threshold range, optimization on the average length is not carried out; otherwise the positive and negative determination step is carried out.

4. The optimization method according to claim 1, wherein before the residual phase difference calculation step, the optimization method further comprising:
   a down sampling step, for performing a down sampling of the received current phase and data modulation phase, and then performs the residual phase difference calculation step by using the current phase and the data modulation phase obtained by the down sampling.

5. The optimization method according to claim 4, wherein before the threshold determination step, the optimization method further comprising:
   a normalization processing step, for normalizing the auto-correlation value of the residual phase difference;
   the threshold determination step determines whether the absolute value of the normalized auto-correlation value of the residual phase difference is larger than a predetermined value being less than 1, and when the absolute value is less than the predetermined value, optimization on the average length is not carried out; otherwise the auto-correlation value of the residual phase difference is further determined by performing the positive and negative determination step.

6. The optimization method according to claim 5, wherein a normalization coefficient used in the normalization process is $$\frac{1}{R_{\Delta\varphi_k+\varphi_{n,k}}(0) - R_{\Delta\varphi_k+\varphi_{n,k}}(1)},$$

wherein $R_{\Delta\Phi_k+\Phi_{n,k}}(0) - R_{\Delta\Phi_k+\Phi_{n,k}}(1)$ denotes a difference between auto-correlation values of the residual phase difference with displacement 0 and auto-correlation values of the residual phase difference with displacement 1.

7. Apparatus for adaptive optimization on an average length adopted in a phase recovery device, comprising:
   a residual phase difference calculation unit, for receiving a current phase of a digital symbol obtained by phase recovery and a data modulation phase of the digital symbol obtained by data recovery, and calculating a residual phase difference of the digital symbol, which is a difference between the current phase and the data modulation phase of the digital symbol;
   a residual phase difference auto-correlation value calculation unit, for calculating a auto-correlation value of the residual phase difference with displacement m, wherein $-10 \leq m \leq 10$, and m is an integral;
   an optimization unit, for optimizing the average length based on the residual phase difference auto-correlation value.

8. The apparatus according to claim 7, wherein the optimization unit comprising:
   a positive and negative determination unit, for determining whether the auto-correlation value of the residual phase difference is positive or negative, the positive and negative determination unit outputs an optimization signal indicative of decreasing the average length when it determines that the auto-correlation value of the residual phase difference is positive, and outputs an optimization signal indicative of increasing the average length when it determines that the auto-correlation value of the residual phase difference is negative.

9. The apparatus according to claim 8, wherein before the positive and negative determination unit, the optimization unit further comprising:
   a threshold determination unit, for determining whether the auto-correlation value of the residual phase difference is within a predetermined threshold range, and when the threshold determination unit determines that the auto-correlation value of the residual phase difference is within the predetermined threshold range, optimization on the average length is not carried out; otherwise the auto-correlation value of the residual phase difference is determined by using the positive and negative determination unit.

10. The apparatus according to claim 7, wherein before the residual phase difference calculation unit, the apparatus further comprising:
    a down sampling unit, for performing a down sampling on the current phase and data modulation phase received; and
    the residual phase difference calculation unit calculates the residual phase difference by using the current phase and the data modulation phase obtained by the down sampling.

11. The apparatus according to claim 10, wherein before the threshold determination unit, the apparatus further comprising:
    a normalization processing unit, for normalizing the auto-correlation value of the residual phase difference;
    the threshold determination unit determines whether the absolute value of the normalized auto-correlation value of the residual phase difference is larger than a predetermined value being less than 1, and when the absolute value is less than the predetermined value, optimization on the average length is not carried out; otherwise the auto-correlation value of the residual phase difference is determined by using the positive and negative determination unit.

12. The apparatus according to claim 11, wherein a normalization coefficient used in the normalization processing unit is $$\frac{1}{R_{\Delta\varphi_k+\varphi_{n,k}}(0) - R_{\Delta\varphi_k+\varphi_{n,k}}(1)},$$

wherein $R_{\Delta\Phi_k+\Phi_{n,k}}(0) - R_{\Delta\Phi_k+\Phi_{n,k}}(1)$ apparatus a difference between auto-correlation values of the residual phase difference with displacement 0 and auto-correlation values of the residual phase difference with displacement 1.

13. A coherent receiver, characterized in that, comprising the apparatus in claims 7.

* * * * *